Dec. 22, 1931.  G. C. FEDDERMAN  1,837,657
MEANS FOR HOLDING AUTO CHOCK BLOCKS
Filed June 27, 1929   2 Sheets-Sheet 1
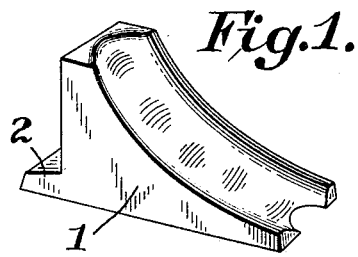
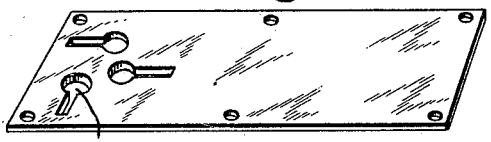
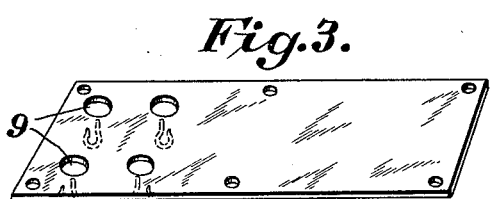
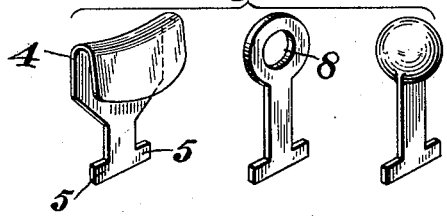
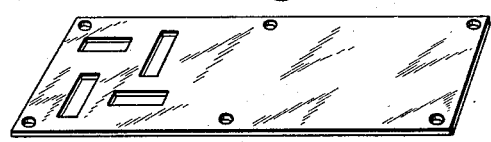
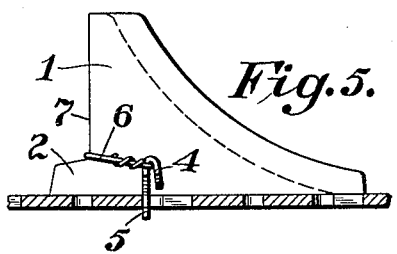
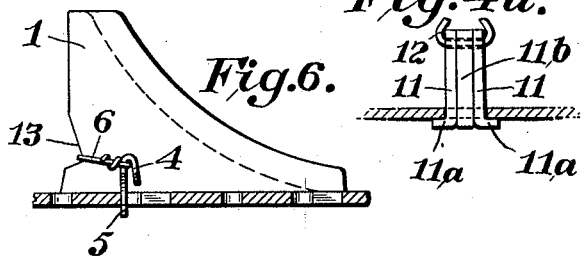
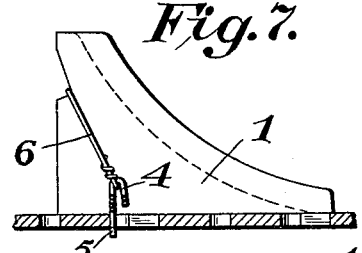
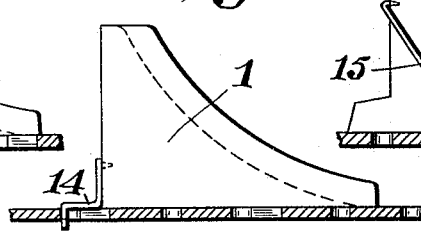
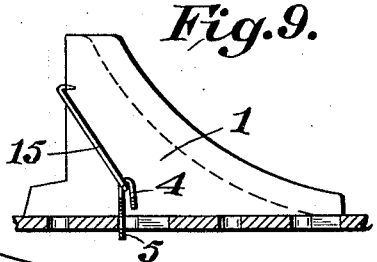
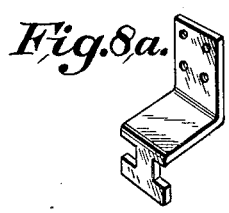
INVENTOR:
George C. Fedderman,
BY
ATTORNEYS.

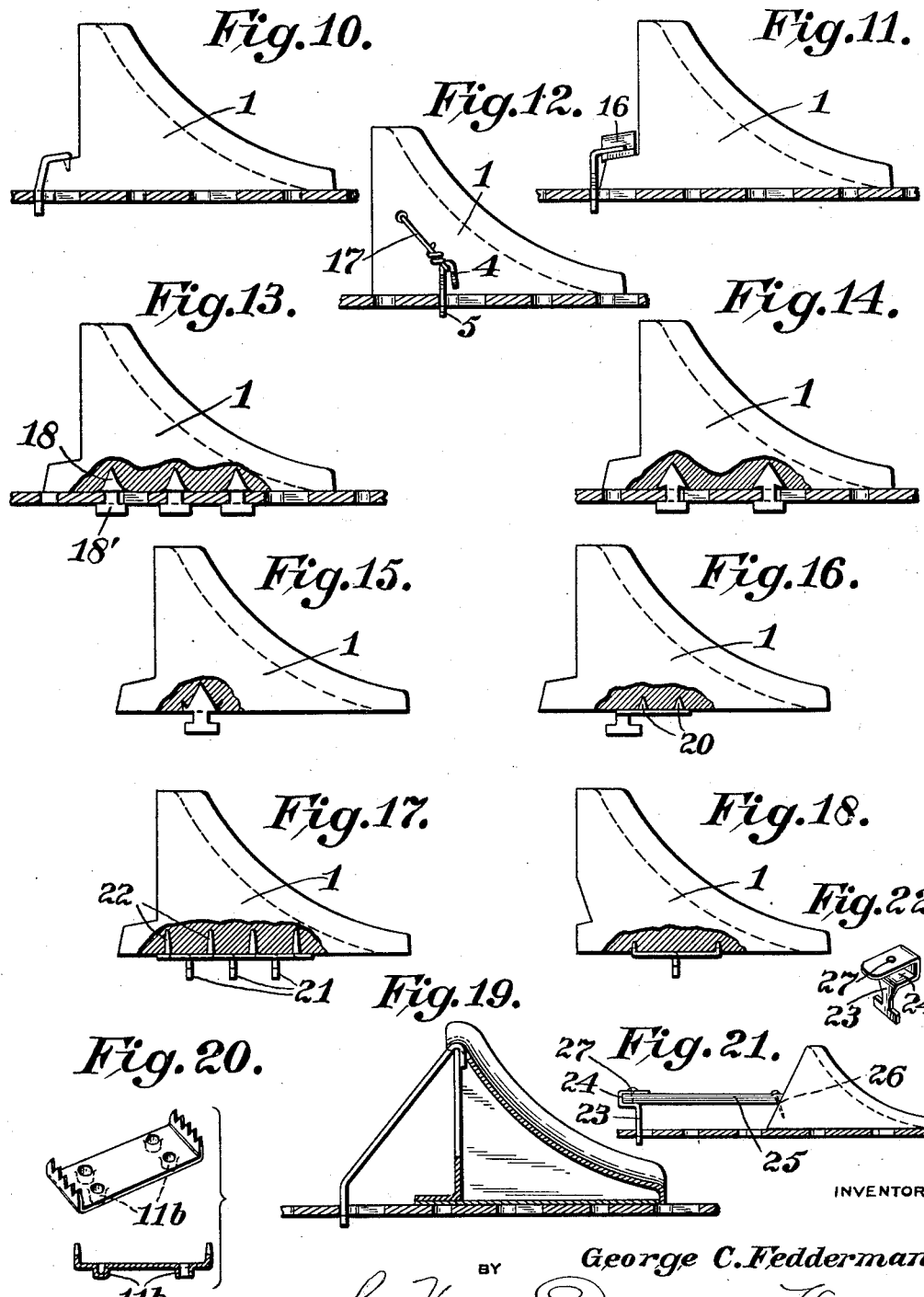

Patented Dec. 22, 1931

1,837,657

UNITED STATES PATENT OFFICE

GEORGE C. FEDDERMAN, OF DETROIT, MICHIGAN, ASSIGNOR TO AUTO LOADING DEVICE MANUFACTURING COMPANY, OF DETROIT, MICHIGAN, A CORPORATION OF MICHIGAN

MEANS FOR HOLDING AUTO-CHOCK BLOCKS

Application filed June 27, 1929. Serial No. 374,088.

One object of the invention is to provide means whereby a chock block of the general form now marketed can be attached to a car floor having a special form of plate attached to or forming a part of said floor for use with hold down means for automobiles.

A plate of this special form may be mentioned as an example, as being one like that shown in my application filed March 8, 1929, No. 345,467, which is inserted in or attached to the floor of the car and is provided with a plurality of means adapted to receive the hold-down device which is connected with some part of the automobile to hold it down to the floor during transportation. Such plate in the application mentioned shows in one form key-hole slots to receive a part of the hold-down means, and in the present application I show how such plate may be used as part of the means for securing the chock blocks in place.

Either a wooden chock block a composition or a metal one can be held to this floor plate, and they each may be of the kind that can be used also by simply nailing them to a wooden floor as is well known.

The wood block may have an extended heel, or it may have the so called incut heel, such block ordinarily being held to the wood floor by nailing it through the extended heel or through the incut heel, or the block may be of other forms.

The invention is shown in the accompanying drawings in which

Figure 1 is a perspective view of a known form of chock block.

Fig. 2 is a view of a floor plate adapted to be attached to the car floor.

Figs. 3 and 4 are modifications of said plate.

Fig. 2a shows views of devices adapted to interlock with the floor plate of Fig. 2 to serve as means for attaching the connection leading to the chock block for holding it in place on the car floor and against the wheel tire.

Fig. 3a shows means for attachment to the floor plate of Fig. 3.

Fig. 4a is a view of means for attachment to the floor plate of Fig. 4.

Fig. 5 illustrates a chock block of the form shown in Fig. 1, a floor plate and attaching means.

Fig. 6 is a view similar to Fig. 5 of another form of block, i. e. one having the so called incut heel.

Fig. 7 is a view similar to Fig. 5 of another form of chock block with its securing means.

Fig. 8a is a detail.

Figs. 8, 9, 10, 11 and 12 illustrate modified forms of the invention.

Figs. 13, 14, 15, 16, 17 and 18 are views of means in various forms which may be attached to the floor plate upon which the block is pressed down to be penetrated thereby and thus held in position.

Fig. 19 is a view showing a metal block with the holding means.

Fig. 20 shows another form, Figs. 21 and 22 another form.

The chock block may be of the well known variety composed of wood as shown at 1 Fig. 1 and having an extended heel 2. This block is adapted to be nailed to a wooden car floor by nails driven through the extended heel. It is one object of the invention to use this block in connection with a freight car having a metal plate as shown in Fig. 2 attached to the floor of the car. Such plate may have the general form shown in the application above mentioned in that it is provided with a series of key-hole shaped openings 3 pointing in different directions, and disposed substantially over the entire area of the plate. The floor plate is of such area as to compensate for various relative positions that the automobile wheel may assume in respect thereto so that no matter upon what part of the plate the wheel may rest the chock block may be positioned against the tire and at the same time there will be found, in proper adjacent position, key-holes which will enable the attaching means to be placed in connection both with the chock block and the key-holes for holding the block in immovable position on the plate to chock the vehicle against displacement in the freight car during transportation.

Part of the means of forming the connection is shown in Fig. 2a where a hooked member is shown at 4 of flat sheet metal having projections 5 at its lower end. This hook is attached to the floor plate by inserting its lower end through the key hole slot and then turning it so that its projections 5 will underlie the walls defining the large end of the slot so that the hook will be retained in position. This hook as shown in Fig. 5 extends above the floor plate and receives any suitable form of connection 6, which is representative of any suitable strap, rod, wire, rope which may be employed. In this Fig. 5 the connection 6 is passed over the extended heel 2 where this joins the substantially back wall 7 of the chock block. This tie will pass through two hooks, one on each side of the block, and in advance of the rear end of the block. The connection will be drawn tight so that the block will be held in contact with the wheel tire. All slack in this connection is taken up by drawing the connection taut and then by any suitable tie or loop the connection may be fastened.

Fig. 2a also shows an anchoring device, which is a modification of that just described and shown at 4, 5. In this form the hook is replaced by a ring or eye 8 to receive the fastening device.

In Fig. 3 the floor plate is shown with round holes 9 and hooks 10 projecting on the under side of the plate.

Any suitable form of anchor and connecting means may engage these hooks and the block.

In Fig. 4 rectangular openings are provided in the foot plate. The anchor shown in Fig. 4a adapted to this opening, though it might be used with others, consists of three parts. Two of these have portions 11a to underlie the foot plate, and an upright portion 11. A spacer member 11b holds the members 11, 11a spread apart to engage the foot plate. Each of the members has an opening to receive a tie member 12 which connects with the chock block in any suitable way. This anchor can be removed by first taking out the spacer piece and then the two bent pieces, one after the other.

In Fig. 6 the attachment is shown in connection with a so-called incut heel. This incut is shown at 13. Ordinarily, i. e., when the chock block is to be used with a wooden car floor, the nail for holding it in place is driven through the heel. When this same block is used in a car having one of the floor plates, I then utilize the incut to receive the tie 6. The block may be formed, as in Fig. 7, with a notch at the upper part of its back face, and the tie 6 will be received in this notch.

In Fig. 8 the fastening means consists of a bent metal piece 14, having an anchor portion to engage the floor plate and having its upturned end provided with a spur or turned edge to engage the block. This fastener may be supplemented by any suitable form of metallic straps at the sides of the chock block nailed or otherwise secured thereto and anchored to the perforated floor plate, such as at Fig. 8a.

In Fig. 9 the tie member may consist of a rod or wire 15 anchored to the floor plate and having a sharp pointed end to enter the rear face of the block, or this may consist of a tie piece nailed to the said rear face.

In Fig. 10 the fastener consists of a metal plate having a sharp upper edge bent so that it can be driven into the top surface of the extended heel, or incut heel. This plate has an anchor portion similar to the anchor parts above described for interlocking with the floor plate. This plate also may be nailed to the top of the heel.

Fig. 11 shows fastening means anchored to the floor plate with a wedge 16 driven in between said fastener and the top of the extended heel.

Fig. 12 shows a fastener 17 extending through an opening in the chock block and anchored to the floor plate.

Figs. 13 to 16 inclusive show different forms of devices to be anchored in the floor plate and upon which the chock blocks may be set to be penetrated thereby for holding them in place. In Fig. 13 the fastening means consists of a conical or pointed member 18 which may be anchored at any desired point on the floor plate, it having the anchor means as at 18' to interlock with any one of the openings in the floor plate according to where the wheel of the vehicle may be located on said plate.

Fig. 14 represents spear headed fastening devices anchored to the floor plate upon which the block may be impaled.

Fig. 15 represents spear headed fastening devices, with anchor portions to go into the floor plate. In this modification, the spear head is provided with supplemental points 19 which are slightly bent in opposite directions.

In Fig. 16 the impaling points 20 are struck up from a plate anchored in the floor plate.

Fig. 17 represents a plate anchored to the perforated floor plate by parts 21 struck downwardly therefrom to enter the openings in the floor plate and with parts 22 struck up therefrom to engage the chock block.

Fig. 18 shows a plate with bent up sides to extend transversely of the underside of the block. These sides have saw tooth upper edges to penetrate the block. This plate may have an anchor to interlock with the floor plate, or it may have a protuberance struck down therefrom to enter the opening in the floor plate. In these forms where the block is impaled, as it were, upon upstanding points of plates, like in Figs. 17 and 18, the anchoring may be done by projections from the members entering the openings in the floor plate, without having the lower anchoring projections, such as at 11b in Fig. 20 to lock beneath the plate. In these forms the tendency of the wheel on the chock block is to press it down, and of course, the pressure from the wheel tends also to slide the block along the floor plate, but such tendency is resisted by the projections entering the openings in the floor plate. There is no normal tendency to raise the chock block from the floor plate by the pressure of the wheel thereon, and hence the main resistance to displacement of the block must be by means which prevents the block from sliding along the floor plate, and in all the constructions described, this result will be attained.

Fig. 19 is meant to illustrate any suitable form of metal chock block held by a rod, strap or plate having a down-turned pointed top end which may be bent over the top at the back of the metal block.

In all the forms the floor plate may be attached to the floor in any suitable manner. It may be embedded therein or slightly raised above the floor, such as in the application above referred to, and it may be associated with an inclined plate as in said application, designed to cause foreign matter to clear away from the perforations.

Various modifications of the invention have been described and it will be understood that where a form of device in one figure is susceptible of use with a device or devices of another figure, this specification is to be construed as applying to this obvious assembly of parts.

While I have described the floor plate as made of metal, it will be understood that I do not limit myself in this particular, and while I have referred to a floor plate, it will be understood that by this is meant any part of the floor which is provided with means for anchoring the chock block fastening devices thereto.

One method of assembling the device with the automobile is to jack up the latter, then place the blocks in position and then lower the automobile into engagement therewith, though it will be understood that I do not limit myself in this respect.

This method would be particularly applicable to those forms in which the block is to be impaled upon upstanding points or spurs.

Figs. 21 and 22 illustrate another means of anchorage. I show this in connection with a block having an inclined rear face though I do not limit myself to the use of this form of block with this particular form of anchoring means. The anchor consists of a fitting 23 to interlock with the keyholes of the floor plate, said fitting having its lower end provided with projections so that the fitting may be placed in or removed from the floor plate as previously described. This fitting or anchoring member proper is provided with a hooked or jaw formation at its upper end 24 in which is received the end of a strut 25 having its front end adapted to bear on the rear face of the block. If used with a chock block having a rear inclined face the forward end of this strut will be inclined to fit said inclined back of the chock block. When placed in position the strut may be nailed at 26 to the back of the block, and the fitting or anchoring member has a hole at 26 by which a nail may be driven through the strut to hold it in the jaws of the fitting.

The strut may be used with a vertical back block. It may be so proportioned and the anchor member may be placed in such one of the key holes as will have a wedge effect on the block to press it firmly against the tire.

I claim:

1. Means for holding vehicles in freight cars comprising a chock-block to engage the wheel tire, a floor plate attached to the car floor and means for holding the chock block to the floor plate, said floor plate being provided with spaced apart apertures each of restricted area for individually receiving the chock block holding means in various positions to accommodate various positions of the chock block relative to the floor plate, substantially as described.

2. Apparatus according to claim 1 in which the holding means detachably engages the chock block.

3. Means for holding vehicles in freight cars comprising a chock block, a floor plate, and means for holding the chock block to the floor plate, said clock block having a heel extending rearwardly therefrom, said heel receiving thereover the said holding means for securing it to the floor plate.

4. Means for holding vehicles in freight cars comprising a chock block, a floor plate, and attaching means between the block and plate, said attaching means extending from its point of attachment with the chock block forwardly towards the small end of said block, substantially as described to its point of attachment with the floor plate.

5. In combination in means for holding vehicles in freight cars a chock block, a floor plate and holding means between said block and plate, said holding means engaging the rear portion of the chock block and reaching the floor plate externally of the block.

6. Apparatus according to claim 1 in which the holding means engages a recess formation in the block and extends thence externally of the block to the floor plate.

7. Apparatus according to claim 1 in which the holding means extends forwardly from the rear portion of the block to anchoring means at each side of the block along the lateral faces thereof.

8. Apparatus according to claim 1 in which the holding means engages the underside of the block from any one of the various positions on the base plate.

9. Apparatus according to claim 1 in which the holding means engages the upper portion of the block, and extends thence externally of the block to the floor plate.

10. In combination a chock block, and means for anchoring the same to a car floor comprising a floor plate attachable to the car floor having pre-formed spaced apart apertures each of restricted area to receive said anchoring means, substantially as described.

11. In combination a plate with means for attaching it to a car floor and having spaced apart apertures of restricted area and each serving for one position of a chock block, and holding means for said chock block engageable with any one of said apertures, substantially as described.

12. Apparatus according to claim 1 in which an anchoring piece is attached to the floor plate and has a recess, and a strut is held in said recess and presses upon the chock block.

13. Apparatus according to claim 1 in which the holding means consists of a member at the side or sides of the block attached to said side or sides and anchored in the floor plate.

14. Means for holding vehicles on a support comprising a chock block to engage the wheel tire, said support having preformed apertures, one for each prescribed position of the block said apertures being disposed at various points over a prescribed area of said support to be occupied by said vehicle wheel, and anchoring means for said chock block to engage any of said preformed apertures by interlocking with the wall thereof.

In testimony whereof, I affix my signature.

GEORGE C. FEDDERMAN.